United States Patent [19]

Bubley et al.

[11] 4,452,138
[45] Jun. 5, 1984

[54] SCREEN PRINTING FRAME

[75] Inventors: Henry J. Bubley, Deerfield; Melvin E. Green, Evanston, both of Ill.

[73] Assignee: American Screen Printing Equipment Co., Chicago, Ill.

[21] Appl. No.: 389,174

[22] Filed: Jun. 17, 1982

[51] Int. Cl.³ ............... B05C 17/08; B41L 13/02
[52] U.S. Cl. ..................... 101/127.1; 101/383; 160/381; 403/402
[58] Field of Search ............. 101/127, 127.1, 363; 160/381; 403/401, 402

[56] References Cited

U.S. PATENT DOCUMENTS

| | | | |
|---|---|---|---|
| 2,545,277 | 3/1951 | Hannah | 101/127.1 |
| 2,894,579 | 7/1959 | Rust | 160/381 |
| 3,189,136 | 6/1965 | Stickney | 403/402 |
| 3,273,633 | 9/1966 | Seidmon | 101/127.1 |
| 3,485,519 | 12/1969 | Chiu | 403/402 |
| 3,606,419 | 9/1971 | Virkler | 160/381 |
| 3,608,482 | 9/1971 | Bubley | 101/127.1 |
| 3,608,484 | 9/1971 | Bubley et al. | 101/127.1 |
| 3,729,868 | 5/1973 | Burum | 160/381 |
| 4,077,160 | 3/1978 | Stewart | 160/381 |
| 4,090,799 | 5/1978 | Crotti | 403/401 |
| 4,145,150 | 3/1979 | Rafeld | 403/402 |

FOREIGN PATENT DOCUMENTS

| | | | |
|---|---|---|---|
| 1270756 | 6/1968 | Fed. Rep. of Germany | 160/381 |
| 619647 | 10/1980 | Switzerland | 101/127 |
| 1418317 | 12/1975 | United Kingdom | 403/401 |

Primary Examiner—Clyde I. Coughenour
Attorney, Agent, or Firm—Fitch, Even, Tabin & Flannery

[57] ABSTRACT

A screen printing frame is formed with hollow extruded metal frame members joined at their ends by extruded metal interfitting connectors which are retained within the ends of their associated frame members by frictional engagement supplemented by a bonding agent. The force required to establish the frictional engagement is maintained in the preferred embodiment by elastic flexure of a bowed side wall on each connector arm. The structural members may have prefinished surfaces such as anodized surfaces and are joined together without welding as would mar such surfaces during the welding operation. The amount of metal used for the extrusions has been minimized for cost reduction and to obtain a lightweight structure.

Grooves on the interfacing surfaces of the connector arms and the frame members cooperate to form an interstitial lattice which receives a bonding agent. Miter joints at the corners of the structure are sealed by corner webs on the connectors in combination with a bonding agent.

8 Claims, 6 Drawing Figures

SCREEN PRINTING FRAME

The present invention relates generally to screen printing frames and more particularly to an improved screen printing frame structure.

The purpose of the frame in the screen printing process is to support the screen while maintaining uniform tension on all parts of the screen during the forcing of ink through the screen. The magnitude of the forces involved in maintaining this tension is such that strength and rigidity of the frame structure are of primary importance.

Any deformation of the structure under the tension of the screen results in an inferior print. One of the goals of the screen printing equipment industry has been to provide a lightweight, inexpensive frame structure having sufficient strength, stability and durability to withstand repeated use under routinely heavy loadings. Most of the frames currently in use are rectangular, having four straight frame members joined at their corners. Various methods of fastening the frame members together have been and are currently in use. Heretofore, many of the screen frames used steel or cast metal straight frame members which are relatively expensive. Such cast frame members often used fasteners or welds to join the corners together. In contrast to the heavy cast metal frames used in the past, it is now preferred to use lightweight extruded metal side members often made of aluminum or magnesium alloys. Often the side members are anodized metal. Welding of such frame members is expensive, requiring specialized equipment, and it does not leave a smooth surface at the joint. The welding also mars the anodized surfaces of the corners of the frame. Also, to weld you need relatively thick cross sections of metal which add to the cost and weight of the frame. When tubular frame members are used, they are commonly joined by internal connectors telescoped into the hollow ends of the frame members and held in place by mechanical fasteners, such as bolts or screws, or by bonding agents. Use of mechanical fasteners has proven unsatisfactory because it requires the expense of perforation of the side walls and permits leakage through the corner joints as well as the perforations. In addition, protruding ends of such fasteners, such as screw heads, may catch paint and make cleaning more difficult.

Bubley U.S. Pat. No. 3,608,482 discloses the use of flat angle shaped plates inserted into the hollow ends of the frame members and secured in place with epoxy cement. The angle shaped plates, while adequate, did not provide the rigidity and stability desired.

Accordingly, a general object of the present invention is to provide a lightweight, inexpensive screen printing frame structure of sufficient strength, rigidity and stability to be suitable for repeated use under relatively heavy loading.

Another object of this invention is to provide an improved screen printing structure which may be readily assembled from prefinished tubular members joined at their corners by connectors wedged or frictionally held therein and without any welding of the frame members together.

Another object of the present invention is to provide a frame structure sealed against penetration of liquids into the interior of the structure.

Other objects and advantages of the present invention will become more apparent from the following detailed description and the accompanying drawing in which.

Figure 1:
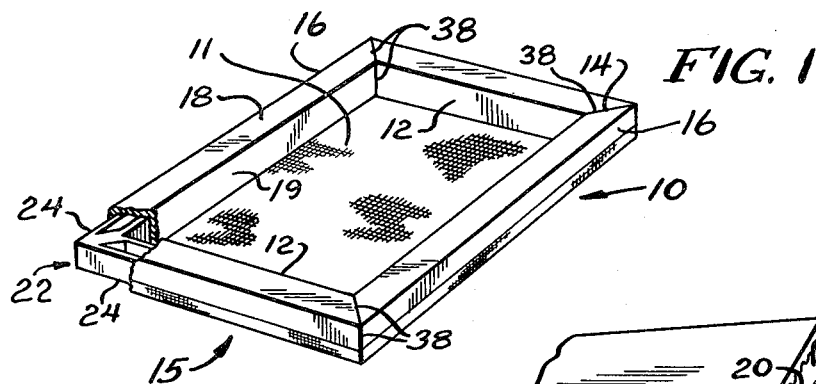
FIG. 1 is a perspective view of a screen printing frame embodying the present invention with portions of two adjacent frame members cut away to show portions of an internal connector.
Figure 2:
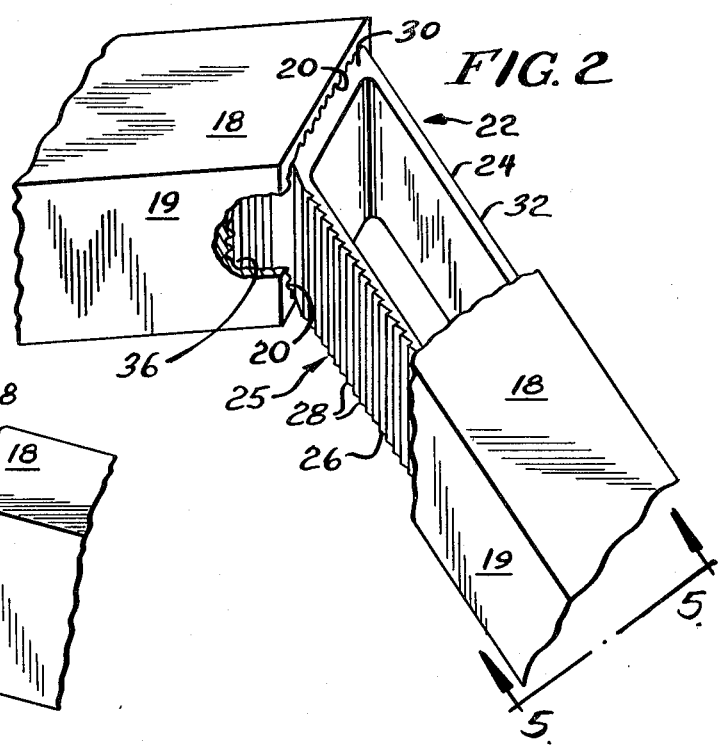
FIG. 2 is an enlarged perspective view of one corner of the frame of FIG. 1 having portions of the frame members cut away to show portions of an internal connector.

As shown in the drawings for purposes of illustration, the invention is generally embodied in a rectangular frame 10 having pairs of opposed tubular frame members 12 and 16 having mitered ends 13 and 14, respectively joined at their corners by interfitting connectors 22. A tensioned screen 11 is fastened to the frame 10 by means such as epoxy or other adhesive to complete the screen printing frame 15.

In accordance with the present invention, the frame 10 for the silk screen assembly is formed with lightweight extruded metal members 12 and 16 which are joined at the corners to each other by lightweight interfitted internal connectors 22 which are frictionally retained in the corners and which are also glued at the corners to their respectively associated frame members 12, 16. The connectors are shaped to maintain the side frame members together with strength and stability while using a reduced amount of metal for the frame. This is achieved by forming the connectors to be hollow and by having each connector 22 shaped so as to have portions 25 deflected or bent when forced into telescoping relationship within an associated tubular side member. To assist in preventing the shifting or displacement of an internal connectors 22 from their associated side frame members, the engaging surfaces are grooved to prevent sliding relative to one and also are formed to define glue receiving pockets between adjacent surfaces to receive the glue to create the permanent bond.

The preferred connectors 22 are formed inexpensively by being formed from metal extrusions to be inexpensive and are shaped with walls which use reduced amount of metal so as to be lightweight, but yet sufficiently strong to resist the forces applied thereto during the silk screen printing operation. As will be explained in greater detail each of the preferred deflected portions 25 is in the form of a bowed side wall 26 which is deflected to provide a tight fit with a frame member when a connector arm is telescoped into a frame member. Typically, extrude side frame members may have tolerances of plus or minus 0.020 inch which makes it difficult to size the interconnecting member to achieve a tight fit in such a widely varying size tubular opening.

To provide rigidity at the corners of the frame 10 and also to serve as a sealing surface to hold and receive a glue coating, each connector 22 has a corner web 30 which is aligned beneath the abutted end walls 13 and 14 to prevent leakage of fluids through the mitered ends into the hollow interior of the frame 10.

To reduce the weight of the frame, the illustrated frame members 12 and 16 have grooves 20 extending longitudinally within their interior facing sides. The grooves 20 reduce the weight of metal and hence, the cost thereof while still retaining a good cross section of resist bending. The grooves 20 also serve as receptors for glue.

Thus, there may be provided a light weight and inexpensive frame which may use prefinished tubular frame members, such as anodized aluminum, joined together without welding to form a stable and strong frame.

Figure 6:
FIG. 6 is an enlarged fragmentary view of a typical frame member of FIG. 1.
Figure 5:
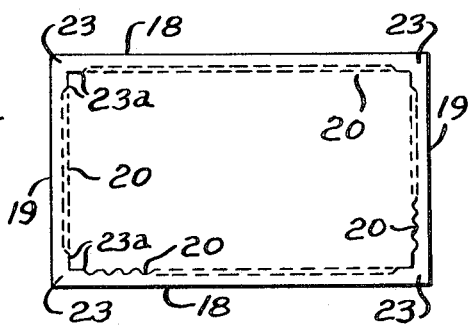
FIG. 5 is an enlarged, end view of a typical frame member of looking generally along the line 5—5 of FIG. 2.

Turning now to a more detailed description of the present invention, which is shown in its preferred embodiment for illustration only, the four hollow frame members 12, 16 are assembled in a rectangular configuration and joined at their ends by the connectors 22. The preferred frame members 12 and 16 are rectangular in cross section each having the same dimensions and each being cut from the same extrusion. As best seen in FIG. 5, the frame members have longer width top and bottom walls 18 than vertical side walls 19. Longitudinal grooves 20 are formed in the respective side walls 18 and 19 of the frame members 12, 16 during the extrusion process to decrease weight and thereby the material cost without substantial alteration of their load handling characteristics. The grooves 20 preferably do not extend into the corners 23 (FIG. 5) of the frame member so that an enlarged cross section is available at the corners to resist cracking of the metal. Corner lands 23a are shown without grooves 20 at the corners 23 in FIG. 6. The frame 10 may be easily made into various lengths and widths with the side frame members 12 and 16 being cut from extrusions with no waste of stock. While the frame members in the preferred embodiment are of rectangular cross section, other shapes may also be used.

The connector 22 in the preferred embodiment is generally right angle shaped with two arms 24 joined to each other at right angles and joined at a common corner web 30. Each arm 24 comprises a pair of spaced, vertical side walls 26 and 32 and an outer end wall 34 joined to the outer ends of the side walls. One wall 26 of each arm is bowed so as to be outwardly convex causing flexure of this wall upon insertion of the arm into its associated frame member, and resulting in frictional engagement of the arm. Preferably, the bowed section 26a of each arm deflects sufficiently between an outer corner 35 and the corner wall 30 to take up any tolerance variation between the vertical walls 19 of the side frame members.

To reduce the weight and material cost for the connectors and to aid in the gluing process and to prevent pulling out of the side frame member from the connector, the preferred connectors are formed with grooves 28 on the external surface of the arm wall 26. The grooves 28 are oriented so as to be perpendicular to the connector arm grooves 20 and when the connector is in place the grooves 28 and 20 define an interstitial lattice to receive epoxy cement or some other bonding agent 36. When the bonding agent has filled the lattice hardened, it supplements the frictional engagement to provide a strong, durable, rigid bond between the connector and its associated side member. The preferred grooves 28 are formed with their outer edges or teeth 29 pointed and slightly rearwardly raked so that they readily slide into the frame side member but dig into it and resist outward pulling from frame member 12 or 16.

The corner web 30 performs several functions. It adds strength and stiffness to the connector structure, aiding in the maintenance of uniform tension on the screen and it provides a sealing surface at the miter joint. Epoxy or some other bonding agent 36 is applied to the horizontal external web surfaces 30a (FIG. 4) and to the abutting ends 13 and 14 of the frame members. Epoxy glue may also be applied to exterior and interior corner walls 40 and 41 of connector so that when the parts are in assembled relation a liquid-tight seal is formed at each corner.

Figure 3:
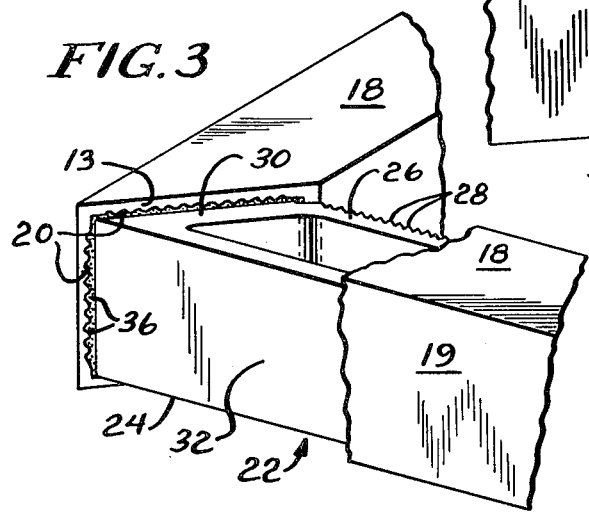
FIG. 3 is a perspective view of one corner of the frame of FIG. 1 having a portion of one of the frame members cut away to shown portions of an internal connector.
Figure 4:
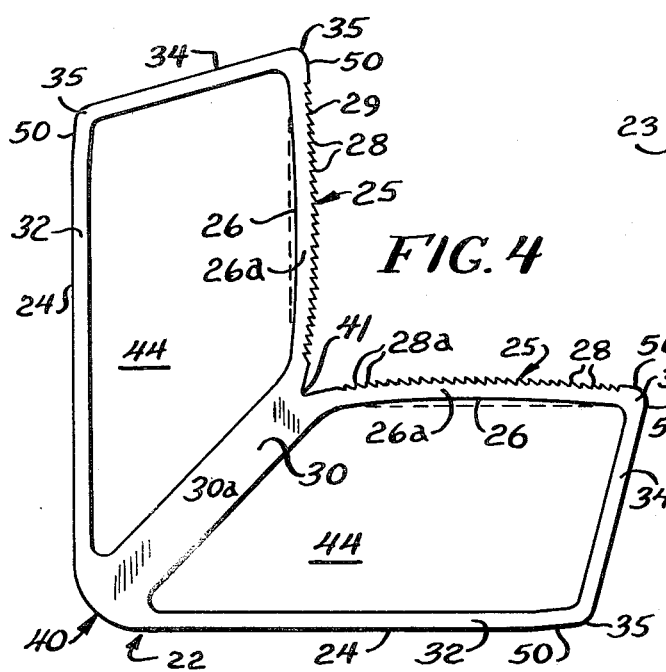
FIG. 4 is an enlarged plan view of the connector used in the frame of FIG. 1.

To provide additional stiffness and to facilitate insertion of the connector arms 24 into the tubular side frame members 12 and 14, the leading end of each arm is tapered and rounded at the corners. Herein, inner facing corner 35 is leading and it is formed with a radiussed end to slide more easily along the inside vertical wall 18 of the frame member. The outer corners 35 are beveled at slanted surfaces 50 to facilitate insertion of the arms 24 into the frame members. The end wall 34 closes the internal hollow opening 44 at the outer end of the arm of each connector. The hollow opening 44 is open at the top and bottom, as seen in FIGS. 3 and 4.

The use of internal connectors 22 and epoxy cement at the corners 30 is preferable to alternatives such as using mechanical fasteners or welding. Use of mechanical fasteners, such as bolts, makes assembly more complex and expensive, and requires perforation of the walls of the side members. Welding is relatively expensive and generally requires thick walls and will interfere with an anodized or other prefinished surface on the frame members. The present invention avoids these problems and has the additional advantages that the miter joints 38 at the corners are sealed and the external surfaces of the structure are smooth and free from any projections or indentations which might collect paint.

The dimensions of the various parts of the frame structure may vary depending upon the size of the screen and the load-handling specification. By way of illustration for a large size of screen frame 10, the illustrated frame members 12 and 16 are nominal 2.5 inch by 1.5 inch with hollow inside dimensions of 2.344 inch width and 1.344 inch height. The walls of these members have a maximum thickness of 0.078 inches measured from the top end of a groove with internal longitudinal grooves 20 formed to a depth of 0.018 inch therein. The sides of the grooves are pitched at 45 degrees. No grooves are formed within 0.125 inch lands 23a of the internal corners 23.

By way of illustration, the connectors 22 used in this embodiment have arms 24 with a width of 2.355 inch between the bowed wall 28 and the opposite wall 32 so that flexure of the bowed wall is obtained upon insertion into the frame member having inside width of 2.344 inch between vertical side walls 19. These width dimensions are to the top of the teeth defining the outer edges of the grooves 20 and 28. The corner web 30 is preferably 0.500 inch thick. To assist in insertion of the arms into the frame members, they are preferably provided with slanted lead in surfaces 50 at an angle of 5 degrees for about 0.375 inch. The illustrated arms have a maximum arm length of 5.625 inches.

The transverse grooves 28 on each arm 22 have a sawtooth cross-section oriented to facilitate insertion of the arm into its associated frame member and provide resistance to withdrawal of the arm. The grooves in the illustrated embodiment are spaced 0.063 inch apart. The bowed wall has a thickness of 0.156 inch to the top of the teeth defining the grooves and the grooves have a depth of 0.031 inch. The thickness of the other connector walls 32 and 34 is 0.125 inch.

From the foregoing, it will be seen that the present invention provides an improved screen printing frame structure which is light in weight and formed of inexpensive frame elements which may be extruded members. The frame members may be readily interconnected without welding or damage to a prefinished surface on the members. The connectors at the corners grip the frame members and provide a strong and stabil corner.

While a preferred embodiment has been shown and described, there is no intent to limit the invention by this disclosure.

What is claimed is:

1. A screen printing frame structure comprising:
   a screen; four metal tubular frame members having hollow interiors assembled into a quadrilateral configuration with the screen being bonded at its edges to said members; rigid internal connectors of metal having positioning surfaces at right angles to each other telescoped into the hollow interiors of adjacent frame members at their ends and rigidly positioning the frame members to form right angle corners for the structure, each said connector having two arms, a resilient portion on each of said arms being deflected when the arm is telescoped into a frame member so that each of said arms is frictionally engaged within its associated frame member; the hollow tubular frame members having outer surfaces free from recesses or protrusions for collecting solvent,
   sealing means at the intersections of the ends of the tubular frame members to prevent a liquid path into the interior of the hollow members, and bonding means for bonding facing surfaces on each of said arms and said frame members to supplement the frictional engagement and to unite the tubular frame members and internal connectors without use of external fasteners.

2. A structure in accordance with claim 1 including a central corner web at the juncture of the arms of the connectors to add rigidity to the corners, each of the connectors being hollow and having vertical walls extending outwardly from and joined to the corner web, one of said walls being said resilient portion.

3. A structure in accordance with claim 2 in which an end wall joins each of said vertical walls at the outer ends of said connector to add strength to the arms.

4. A structure in accordance with claim 3 in which said connector is a hollow extrusion having an opening in each arm extending in the extruding direction, each of said walls of said connector extending in the direction of extrusion.

5. A structure in accordance with claim 3 having said arms formed with rounded corners at their leading ends to facilitate insertion of said arms into their associated frame members.

6. A structure in accordance with claim 1 wherein each end of the frame members is tubular and is beveled and abutted to another end of an adjacent frame member to form miter joints at the corners of the structure.

7. A quadrilateral screen printing frame structure for attaching to and holding taut a silk screen,
   said frame comprising:
   four tubular frame members of anodized aluminum having side walls defining closed hollow interiors and being elongated,
   said tubular members being made of aluminum extrusions with four substantially planar side walls,
   the ends of each of the frame members being cut on a diagonal to be joined to an adjacent end of another frame member at each of four corners for the frame,
   four rigid connectors made of metal each having two arms extending normal to each other,
   each arm being telescoped into the hollow interior of a frame member,
   positioning surfaces on each of the arms of the connectors disposed at right angles to each other to engage interior sides of the frame member side walls to align and hold the frame members at right angles at the frame corners,
   said rigid connectors being hollow and substantially filling the hollow interior of the frame members at the corners,
   ribs on the arms of the connectors to engage the interior of the side walls of the frame members,
   screen means bonded to at least one of said planar side walls of each of said frame members,
   and bonding means bonding and sealing the ends of the frame members together at the frame corners.

8. A screen printing frame in accordance with claim 1 in which the side walls of the frame members define a substantially square hollow interior cross section for the frame members,
   the exterior surfaces of said side members being flat and planar.

* * * * *